Patented June 17, 1952

2,600,680

UNITED STATES PATENT OFFICE 2,600,680

PROCESS FOR COPOLYMERIZING CONJUGATED DIENES WITH UNSATURATED ESTERS IN AQUEOUS EMULSION

Harold F. Park, East Longmeadow, Mass., assignor to Monsanto Chemical Company, St. Louis, Mo., a corporation of Delaware No Drawing. Application May 12, 1947, Serial No. 747,595

1 Claim. (Cl. 260—83.5)

This invention relates to the copolymerization of conjugated dienes. More particularly, the invention relates to the preparation of diene-unsaturated ester copolymer emulsions.

The emulsion copolymerization of conjugated dienes with unsaturated esters is an important process in the production of synthetic rubber. The conventional processes have included the steps of copolymerizing the monomeric materials in aqueous emulsion, then coagulating the emulsion and washing the coagulated material to remove emulsifying agent, catalyst, coagulant, etc. The coagulating and washing steps are cumbersome, time consuming and add materially to the cost of preparing the copolymer.

It is an object of this invention to provide a process for the copolymerization of conjugated dienes with unsaturated esters in aqueous emulsion.

A further object is to provide a process for preparing aqueous emulsions of conjugated diene-unsaturated ester copolymers which may be direct dried.

Still another object is to provide a process for copolymerizing butadiene and unsaturated esters in aqueous emulsion such that the emulsion produced may be direct dried without being coagulated and washed.

These and other objects are attained by copolymerizing a conjugated diene with an unsaturated ester in aqueous emulsion, using critical ranges of emulsifying agent, catalyst, pH regulator, modifying agent, etc., as will be more particularly set out.

The following examples are given in illustration and are not intended as limitations on the scope of this invention. Where parts are mentioned, they are parts by weight.

Example I

To a glass-lined autoclave were added the following materials:

| | Parts |
|---|---|
| Water | 2,000 |
| Dodecyl mercaptan | 3 |
| Sodium sulfonate of mahogany acids | 3 |
| Ethyl acrylate | 200 |
| Potassium persulfate | 0.7 |

The air in the autoclave was replaced by nitrogen. 500 parts of butadiene were added to the autoclave accompanied by constant agitation of the reaction mixture. The temperature of the autoclave was maintained at 50° C. during the addition of the butadiene and continually thereafter until the internal pressure dropped to 20 p. s. i. Pressure was released and 3.0 parts of hydroquinone were added.

The product was an emulsion of a butadiene-ethyl acrylate copolymer. It could be dried directly by drum drying, spray drying or oven drying to produce a tough elastomeric polymer having low water absorption and good electrical properties.

Example II 80,000 parts of water, 450 parts of carbon tetrachloride, 50 parts of potassium persulfate, 200 parts of the sodium sulfonate of dioctyl succinate and 15 parts of sodium hydroxide were mixed in a glass-lined autoclave. 450 parts of solid carbon dioxide were added to the solution and the autoclave was closed. The pressure within the autoclave rose gradually to 125 p. s. i. and then the autoclave was opened and the pressure was released. Thereupon 45,000 parts of isoprene and 9,000 parts of n-butyl crotonate were added to the autoclave and the autoclave was closed. The temperature of the reaction vessel was raised to 75° C. and constant agitation was provided until the pressure dropped to 5 p. s. i. The vessel was then opened and 60 parts of hydroquinone were added.

The product was an emulsion of an isoprene-n-butyl crotonate copolymer. The emulsion could be dried directly to yield an elastomer having excellent physical properties and low water absorption. It could be compounded and fabricated by normal procedures to give products having excellent stability to ageing.

Example III 2,000 parts of water, 3 parts of dodecyl mercaptan, 3 parts of the sodium sulfonate of mahogany acids, 200 parts of vinyl acetate and 0.7 part of potassium persulfate were charged into a glass-lined autoclave. Nitrogen was blown through the autoclave to remove air and then 500 parts of butadiene were added accompanied by constant agitation of the autoclave contents and a gradual rise in temperature to 50° C. The reaction was maintained at 50° C. and constant agitation was continued until the internal pressure dropped to 20 p. s. i. The autoclave was then opened and 30 parts of hydroquinone was stirred into the reaction product.

The product was an emulsion of a butadiene-vinyl acetate copolymer. The emulsion could be dried directly without coagulation to provide a tough, elastic material having excellent physical properties.

Prior processes for the preparation of copolymers of conjugated dienes and unsaturated esters in aqueous emulsion have required large amounts of emulsifying agents and catalyst which, if left in the synthetic rubber, are extremely detrimental to the physical properties and age resistance thereof. It has now been found that extremely small quantities of emulsifying agent and catalyst may be used and subsequently allowed to remain in the synthetic rubber produced, providing certain conditions are maintained.

In the first place, the emulsifying agent must be one of the so-called ionic compounds which is capable of spontaneous separation into two electrically charged portions, one of which is solvated to a greater extent by the dispersed phase of the emulsion than the other so that the dispersed particles will acquire an electrical charge and thus repel one another to form a stable emulsion.

The emulsifying agent must also be surface-active enough to minimize the surface-energy change resulting from change in interfacial surface area. Emulsifying agents which regulate the interfacial tension between 0 and 20 dynes per centimeter meet this requirement.

The emulsifying agent must be so solvated by the continuous phase that the amount of emulsifying agent absorbed at the dineric interface will buffer the impact of colliding particles and thus decrease the coalescence tendency. It must also structuralize the continuous phase so that cybotaxis will reduce to a minimum the tendency of this phase to disperse. The emulsifying agent must also increase the viscosity of the external phase in order to diminish the magnitude and velocity of kinetic and agitational movement.

The following emulsifying agents will meet the above stated conditions provided that they are used in an amount within the range of .05 to 1.0 part per 100 parts of monomer mixture and provided that other critical conditions pertaining to catalyst pH regulator, polyvalent ion, agitation, and ebullition as set forth below are met: soaps including alkali metal salts of long chain fatty acids such as lauric acid, palmitic acid, stearic acid, oleic acid, coconut oil fatty acids, polyacrylic acids, polymerized alpha alkyl acrylic acids, styrene-maleic anhydride copolymers, etc.; quaternary ammonium salts including diethyl amino ethylol ethyl amine hydroacetate, cetyl dimethyl benzyl ammonium chloride, monoamino meta diphenyl benzene stearate, etc.; ammonium or alkali metal salts of sulfonated organic compounds including sodium salts of alkylated aryl sulfonates, such as dibutyl phenyl phenol sodium disulfonate, monobutyl phenyl phenol sodium monosulfonate, monoethyl phenyl phenol potassium monosulfonate, sodium salts of alkyl naphthalene sulfonic acids, isobutyl naphthalene sodium sulfonate, isopropyl naphthalene sodium sulfonate, sodium salts of sulfonated hydrocarbons, sodium salts of alkyl polyether sulfonates, sodium salts of sulfonated lignin, sodium tetrahydronaphthalene sulfonate, etc. In place of the sodium salts, ammonium salts or salts of other alkali metals such as lithium, potassium, rubidium, and cesium may be used. A mixture of emulsifying agents may be used providing that they are taken from the same class.

As a further means for maintaining the critical features of the emulsifying agents at optimum efficiency, a compound which operates to regulate the pH of the emulsion may be used in the proportions from about .003 to about 0.5 part per 100 parts of monomer mixture. For such emulsifying agents as the alkali salts of sulfonated organic compounds or the quaternary ammonium salts, the pH of the emulsion should be regulated to from about 4.5 to about 6.5. Examples of compounds which operate to maintain a pH of from 4.5 to 6.5 are sodium bicarbonate, disodium hydrogen phosphate, sodium acetate, sodium citrate, potassium formate, etc. In the event that soaps are used as emulsifying agents, the pH of the emulsion may be regulated between about 8 and about 11, using such alkaline materials as hydroxides of alkali metals and alkaline earth metals and quaternary ammonium compounds. The amount of pH regulator used will depend somewhat on the amount and type of catalyst used and especially on the pH of the decomposition products of the catalyst. If hydrogen peroxide is used as a catalyst, the amount of pH regulator may be as small as .002 part per 100 parts of monomer mixture. The amount of pH regulator may also be kept at a minimum if the copolymerization is carried out in the absence of air, e. g., under an atmosphere of carbon dioxide or nitrogen. In many combinations it will not be necessary to use a pH regulator.

Other catalysts than the potassium persulfate shown in the examples may be used, such as sodium perborate, hydrogen peroxide, acetyl peroxide, ammonium persulfate, ceric sulfate, etc. The catalysts must be water-soluble and must have an oxidation reduction potential of less than $-1.5$ volts. Such well known catalysts as benzoyl peroxide, lauroyl peroxide, di(tertiary butyl) peroxide, etc., are for practical purposes insoluble in water and cannot be used, even though their oxidation reduction potential is less than $-1.5$ volts, since their use in the present process produces polymers greatly inferior to those made with the preferred catalysts. The amount of catalyst used may be varied between about .005 to about 0.4 part per 100 parts of monomer mixture. Use of water-insoluble catalysts or catalysts having an oxidation reduction potential of more than $-1.5$ volts or use of the preferred catalysts in amounts outside of the critical range will destroy the conditions which make it possible to use the emulsifying agents according to the process of this invention.

Another condition which must be met before emulsions which may be direct dried can be made is the relative absence of polyvalent ions. If the emulsifying agent belongs to the class known as anion-active, the concentration of polyvalent cations such as aluminum, chromium, ferric, ferrous, calcium, barium, strontium, magnesium, zinc, etc., ions must be less than 100 p. p. m. If the emulsifying agent is cation-active, the concentration of polyvalent anions must also be kept below 100 p. p. m. In addition, other materials capable of destroying active centers must not be present in a concentration exceeding 0.01 molar based on total monomer. Examples of such impurities are molecular oxygen, iodine, sulfur, bromine, selenium, phenols, quinones, amines, etc.

In order to successfully produce emulsions with emulsifying agents and proportions shown above, the system should be subjected to mechanical agitation slightly in excess of that required to provide the increase in surface energy necessary to effect dispersion of the discontinuous phase to an average particle size of between about 0.05 and 0.5 micron. However, care must be taken to prevent sufficient agitation to cause surface turbulence. Furthermore, vigorous ebullition must be avoided since it increases agitation above permissible limits and also since the formation of bubbles of vapor creates a gas-liquid interface which will absorb a portion of the surface-active emulsifier which portion then becomes unavailable to the monomer and stable emulsions cannot be obtained.

If desired, a modifying agent such as the dodecyl mercaptan shown in Example I or the carbon tetrachloride shown in Example II may be used. In place of the compounds already shown, various other sulfur-containing organic compounds may be used, including mercaptans, thiols, organic sulfides, thio and dithioic acids and their derivatives, xanthogenic acids and their derivatives, thiocarbamic acids and their derivatives, etc. Mixtures of two or more of these modifiers may be used. The amount of modifying agent may vary between about .025 to about .35 part per 100 parts of monomer.

The dienes which may be used to form the copolymers of this invention are conjugated dienes such as butadiene, isoprene, chloroprene, cyclopentadiene, dimethyl butadiene, etc. A combination of two or more of the dienes may be used.

The unsaturated esters shown in the examples, i. e., ethyl acrylate, n-butyl crotonate and vinyl acetate may be replaced in whole or in part by other polymerizable unsaturated esters containing a single unsaturated carbon to carbon linkage. The unsaturation may be either in the alcohol or acid radical of the ester. Examples of unsaturated esters which may be used are: the saturated alcohol esters of unsaturated mono- and polycarboxylic acids including the alkyl, aryl, aralkyl and cycloalkyl esters of acrylic and α-substituted acrylic acids, maleic acid, fumaric acid, mesaconic acid, citraconic acid, itaconic acid, crotonic acid, methylene malonic, aconitic acid, cinnamic acid and other acids containing a single unsaturated carbon to carbon linkage; the unsaturated alcohol monoesters of saturated acids such as esters of vinyl, allyl, ethallyl, methallyl, crotonyl and cinnamyl alcohols. Two or more of the unsaturated esters may be copolymerized with the conjugated diene.

In making the emulsions, the ratio of monomer mixture to water may be varied from about 1:10 to about 1:1. This ratio is not critical but for ease in recovering the copolymer and other economic reasons, the ratio of one part of monomer mixture to about two parts of water is preferred. In making the emulsions, all of the ingredients may be mixed together at the same time, followed by polymerization, or they may be separated into a plurality of portions which are then mixed over an extended period of time. A preferable procedure is to add all of the emulsifying agent to the greater proportion of the water and then add a monomer mixture plus a modifier, if desired, to the heated solution of emulsifying agent at a rate slow enough to permit easy control of the temperature of the reaction. The catalyst, dissolved in water, may be added continuously or at intervals during the addition of the monomer mixture, providing that a portion of the catalyst must be added at the same time as or prior to the first addition of the monomer mixture.

The temperature of the reaction may be carried out at the reflux temperature or at temperatures from 30 to 40° C. below reflux temperature. If a gaseous monomer such as butadiene is used, the reaction must be carried out in a pressure vessel such as an autoclave. The pressure present within the autoclave will depend on the temperature of the polymerization and no external pressure need be applied. It is advantageous to exclude air from the reaction vessel. This may be accomplished by the use of inert gases such as nitrogen, carbon dioxide, etc, or by boiling the volatile diene monomers until the air above the reaction has been supplanted by vapors of the volatile diene.

The process of this invention is particularly advantageous since it makes possible the emulsion copolymerization of dienes with unsaturated esters to produce synthetic rubber latexes from which the synthetic rubber may be easily and quickly obtained by direct drying methods such as drum drying, oven drying, etc. The process makes it unnecessary to use large amounts of emulsifying agents; it makes it unnecessary to coagulate the emulsion since it leaves substantially no undesirable impurities in the synthetic rubber which must be washed out before the rubber can be further processed.

It is obvious that many variations may be made in the process and products of this invention without departing from the spirit and scope thereof as defined in the appended claim.

What is claimed is:

A process for copolymerizing n-butyl crotonate with isoprene which consists of mixing together in an autoclave 450 parts of carbon tetrachloride, 50 parts of potassium persulfate, 200 parts of the sodium sulfonate of dioctyl succinate, 15 parts of sodium hydroxide and 80,000 parts of water, adding 45,000 parts of isoprene and 9000 parts of n-butyl crotonate to the mixture and heating the mixture at 75° C. under constant agitation with the autoclave closed to provide pressure until the pressure drops to about 5 pounds per square inch.

HAROLD F. PARK.

REFERENCES CITED

The following references are of record in the file of this patent:

UNITED STATES PATENTS

| Number | Name | Date |
|---|---|---|
| 2,227,517 | Starkweather et al. | Jan. 7, 1941 |
| 2,234,204 | Starkweather et al. | Mar. 11, 1941 |
| 2,333,403 | Youker | Nov. 2, 1943 |
| 2,375,140 | Semon | May 1, 1945 |
| 2,387,385 | Clifford | Oct. 23, 1945 |
| 2,409,915 | Vanderbilt et al. | Oct. 22, 1946 |
| 2,473,390 | Rose et al. | June 14, 1949 |

FOREIGN PATENTS

| Number | Country | Date |
|---|---|---|
| 550,280 | Great Britain | Jan. 1, 1943 |